Nov. 29, 1960
A. MARINO
2,961,730
BLOCK MOLDING MACHINE
Filed Oct. 29, 1954
3 Sheets-Sheet 1
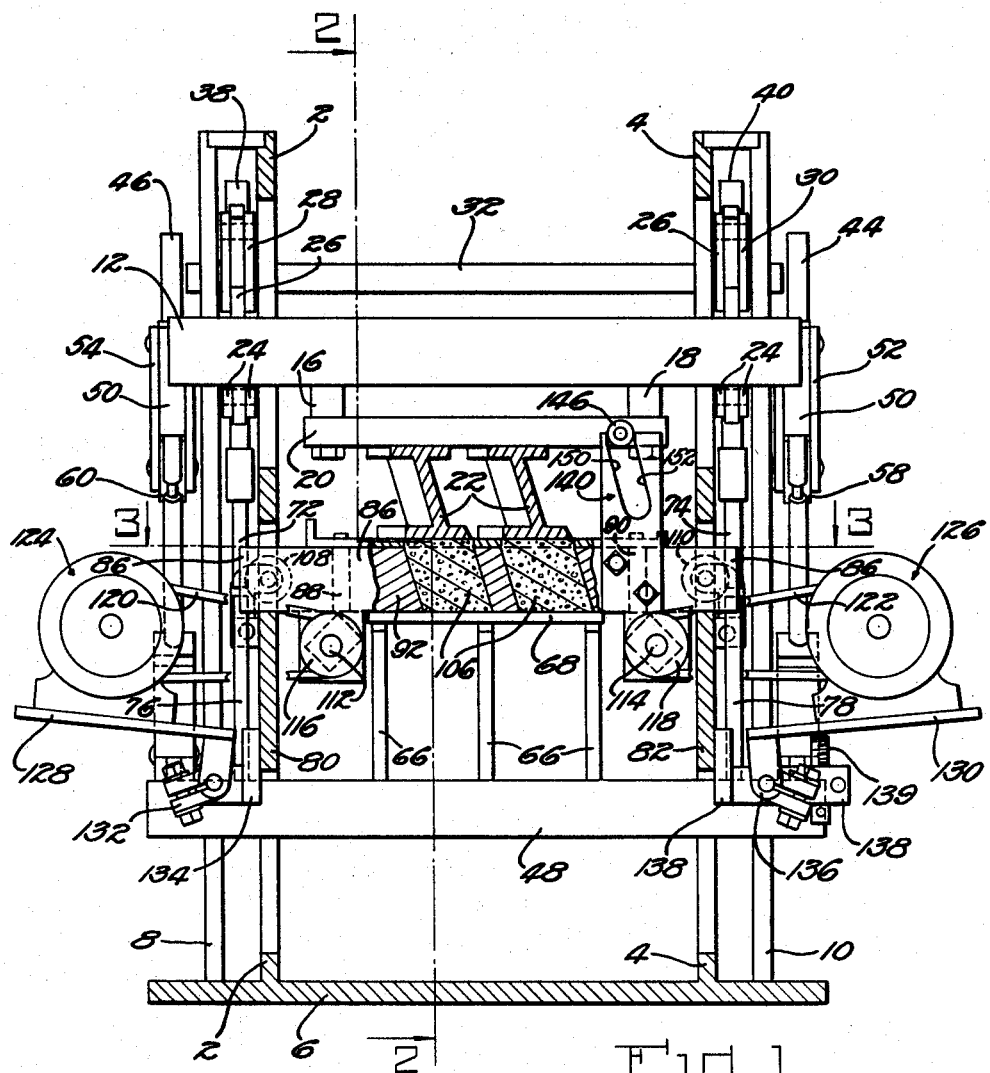
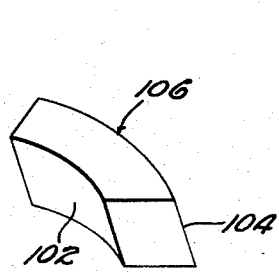
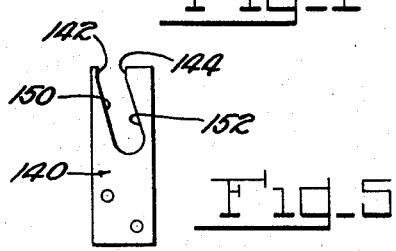
INVENTOR=
ANTHONY MARINO INVENTOR:
ANTHONY MARINO
by Heard, Smith, Porter & Chittick
Attys.

United States Patent Office 2,961,730
Patented Nov. 29, 1960

2,961,730

BLOCK MOLDING MACHINE

Anthony Marino, Avon, Mass., assignor to Batter Block Engineering Corporation, Manchester, N.H., a corporation of New Hampshire Filed Oct. 29, 1954, Ser. No. 465,594

7 Claims. (Cl. 25—41)

This invention relates to machines for molding blocks of cinder, concrete and like materials, and is particularly directed to mechanism for forming batter blocks.

Batter blocks are used to form rounded tops for catch basins or like structures and for this reason they are characterized by two substantially parallel arcuate sides inclined to the vertical. A typical batter block, for example, has its inner and outer curved sides sloping at an angle of 30 to 40°. Heretofore it has been impossible to make such blocks on a standard concrete block machine of the type characterized by a vertically reciprocating pressure head since the blocks are made in molds having sides inclined to the vertical. Consequently, it has been necessary to make batter blocks either manually or by a machine adapted to make only batter blocks. Obviously neither of these solutions is satisfactory from the standpoint of producing an inexpensive product.

Accordingly it is an object of my invention to provide improvements in conventional block making machines whereby said machines are adapted to produce batter blocks without impairment of their ability to produce standard rectangular blocks or barrel blocks, i.e. blocks similar to batter blocks but having their arcuate sides in vertical rather than inclined planes. As a result of my invention it is now possible to produce batter blocks rapidly and cheaply and to make them without recourse to a machine of special design.

Another object is to provide in a block making machine of the type characterized by a vertically reciprocating pressure head, means for variably positioning a mold whose cavity has two surfaces inclined to the vertical and the horizontal so as to permit the stripper shoes carried by the reciprocating pressure head to enter the mold as the pressure head descends and to thereby eject the molded block from the mold.

A further object of this invention is to provide a block molding machine characterized by a mold frame having a mold fixedly secured to it, said mold frame being mounted to move transversely of the direction of movement of the stripper head, i.e. laterally of the machine.

Another important object of this invention is to provide a block molding machine comprising means for automatically moving the mold frame back and forth in a lateral plane in synchronism with the vertical movement of the stripper head.

Other objects and many of the attendant advantages of this invention will be readily appreciated as the same becomes better understood by reference to the following detailed description when considered in connection with the accompanying drawings, wherein, Fig. 1 is a front elevation, partly in section, of a block molding machine embodying the present invention, the machine being shown as it is about to extrude the blocks from the mold;

Fig. 5 is a detail view of one of the parts of the machine; and,

Fig. 6 is a perspective view of a block produced by the machine embodying the present invention.

Figure 2:
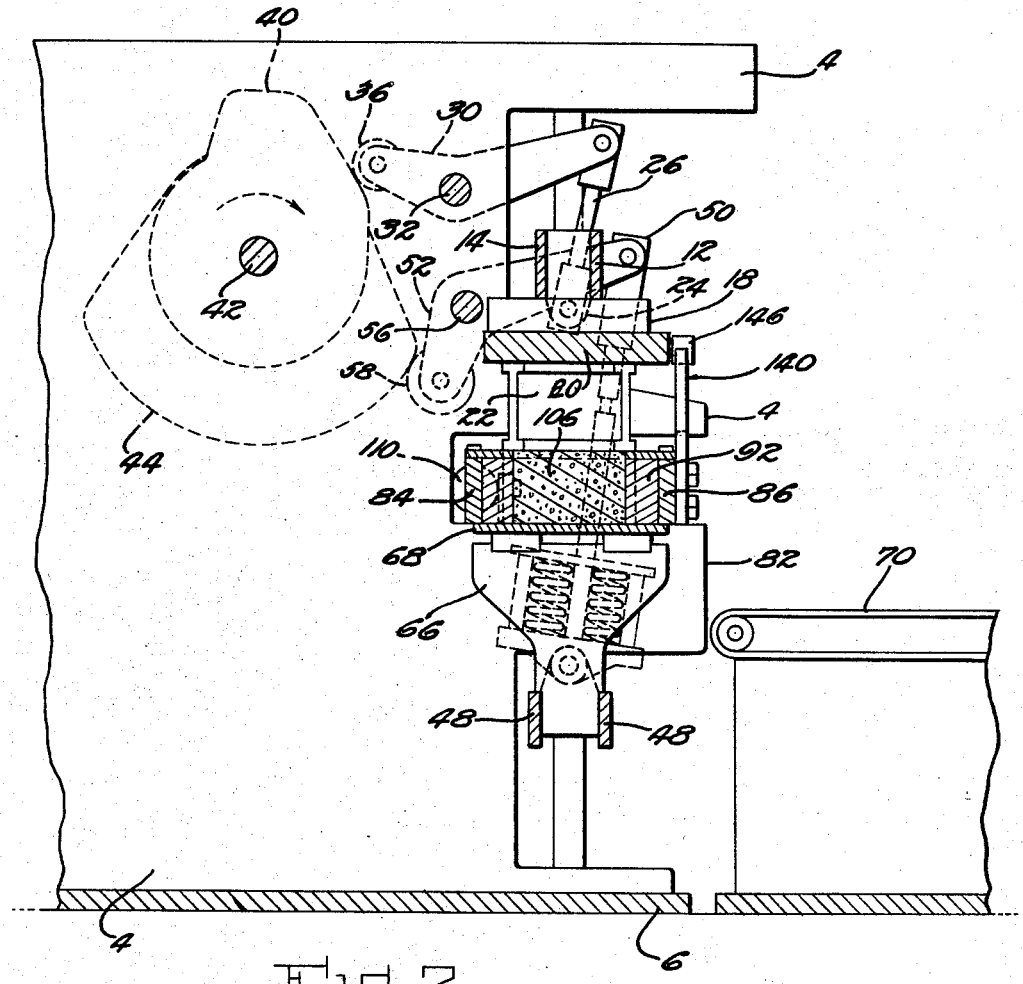
Fig. 2 is a vertical section taken on line 2—2 of Fig. 1.
Figure 4:
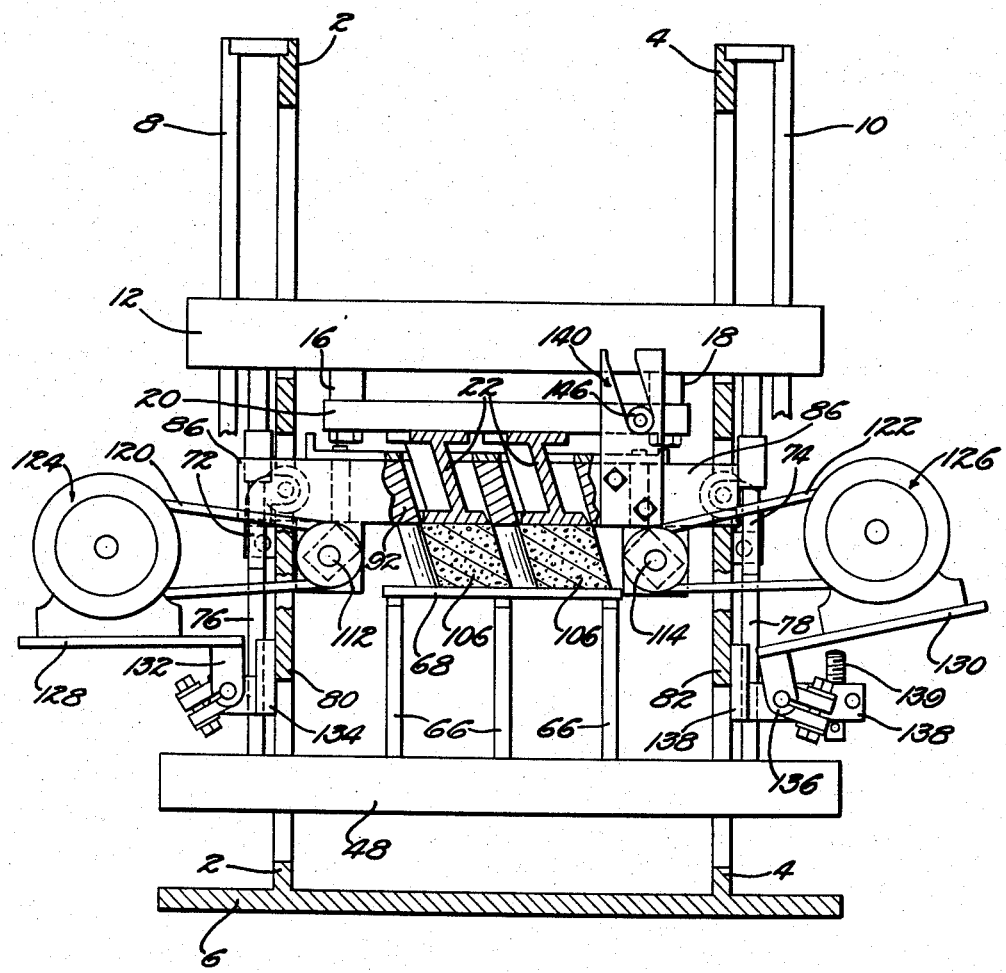
Fig. 4 is a view similar to Fig. 1, but showing the machine after the blocks have been extruded from the mold.

Before describing the present invention in detail it is to be understood that the block molding machine illustrated in Figs. 1, 2, and 4, is of a well known type being modified only to the degree necessary to effectively embody the present invention. Accordingly only so much of the basic machine is illustrated as is necessary to understand the construction and operation of the present invention and to delineate what is conventional from what is novel. However, it is also to be understood that the invention is adaptable to other block making machines as well as the particular one illustrated in the drawings which is illustrated merely for the purpose of facilitating comprehension of the present invention.

The frame of the machine as shown comprises side frame members 2 and 4 formed integral with base member 6. Two vertical guide posts 8 and 10 are secured to base 6 and sides 2 and 4 by suitable means. Mounted for reciprocal vertical movement along guide posts 8 and 10 is a stripper head frame assembly comprising a stripper head frame having front and rear parallel beams 12 and 14 provided with suitable bearing shoes (not shown) which slidably engage guide posts 8 and 10.

Extending transversely of beams 12 and 14 and depending therefrom are two bars 16 and 18 to which stripper head 20 carrying stripper shoes 22 is secured. Just inside of guide posts 8 and 10 beams 12 and 14 are connected to each other by a pair of stirrup members 24 which provide pivot connections between the beams and a pair of connecting links 26. The two links 26 are pivotally connected to the forked ends of levers 28 and 30 which are fixed to a shaft 32 journaled in the upper portion of frame members 2 and 4. Cam follower rollers 34 and 36 are rotatably mounted in the rear forked ends of levers 28 and 30 and extend in the path of stripping cams 38 and 40 which are mounted on a cam shaft 42 extending transversely across the rear of the machine. Cam 38 is designed to raise the stripping head and cam 40 is designed to effect lowering of the stripper head. Mounted on the same cam shaft are two additional cams 44 and 46 which respectively raise and lower a pallet-receiving frame 48. Pallet-receiving frame 48 is pivotally secured to links 50 which are pivotally connected to the forked ends of levers 52 and 54 affixed to a shaft 56 journaled in frame members 2 and 4. Lever 52 has a cam follower wheel 58 which engages cam 44. Lever 54 has a cam follower wheel 60 which engages cam 46. Cam 44 operates to raise pallet-receiving frame 48 and cam 46 operates to lower frame 48. Cams 44 and 46 and cams 38 and 40 are so positioned as to cause a predetermined sequence of operations as explained hereinafter in the description of the mode of operation of the entire machine.

Pallet-receiving frame 48 is provided with a plurality of upstanding pallet receivers 66 which support pallets 68 that are automatically delivered to it from a pallet stack in the rear of the machine by a pallet feed conveyor which is not illustrated in the interest of simplifying the drawings and for the reason that it is not essential to this invention. The pallet receivers 66 pick up the pallet from the aforesaid conveyor means when the frame 48 is moved upwardly from its bottommost position. When the frame 48 again moves downwardly (after a block has been molded in mold 92) the pallet supported by receivers 66 again reengages the pallet feed conveyor (not shown) which then advances the pallet forwardly on to conveyor 70. The latter conveyor moves the pallet and the molded block carried thereon away from the machine for curing and stacking.

The stripper frame 12 is provided with adjustable height stop contactors 72 and 74 which engage adjustable height stop contactors 76 and 78, carried by the pallet receiver frame. These contactors are connected in the electrical circuits of vibrator motors 124 and 126 described hereinafter, and operate to shut off the motors when in engagement with each other. This occurs at a predetermined point in the downward descent of strippers 22.

Machine frame elements 2 and 4 have projecting arms 80 and 82. Extending transversely of these arms is a mold frame comprising parallel beams 84 and 86 spaced from each other by cross beams 88 and 90. These four beams define a rectangular aperture for receiving a mold 92 provided with batter block mold matrices 94 and 96. The curved surfaces 98 and 100 are inclined to form the inner and outer faces 102 and 104 respectively of batter block 106 (Fig. 6).

Secured to the front end of frame elements 2 and 4 are shoes 108 and 110 which have vertical slots for slidably receiving beam 84. Shoes 108 and 110 permit the mold frame to be moved laterally of the machine while simultaneously restricting it against forward and rearward movement. These same shoes also permit the frame to be raised vertically to the degree necessary to carry out the present invention as hereinafter described.

Secured to the bottom of the mold frame are vibrator assemblies 112 and 114 provided with pulleys 116 and 118 respectively. Pulleys 116 and 118 receive belts 120 and 122 associated with motors 124 and 126 respectively. Motors 124 and 126 are carried by motor support plates 128 and 130 respectively. Motor support plate 128 has depending perforated lugs 132 that are pivotally associated with a bracket 134 that is secured to projecting arm 80 of the frame element 2. Motor support plate 130 is provided with a similar depending lug 136 which is pivotally connected to a supporting bracket 138 affixed to projecting arm 82 of frame element 4. A screw 139 carried by bracket 138 prevents motor 126 from swinging below a predetermined level. The motors 124 and 126 are held in their elevated positions by belts 120 and 122, and the position of the mold frame determines the elevated position of motors 124 and 126.

Looking now to the mold frame, there is secured to parallel beam 86 a cam plate 140. Cam plate 140 is provided with a slot which runs vertically for a short distance, and then runs diagonally to the right in the direction of motor 126. As seen in Fig. 5, parallel faces 142 and 144 define the vertical run and faces 150 and 152 define the diagonal run of the slot. As can be seen from Fig. 1, the angle of inclination of the sides of the cam 140 is the same as the angle of inclination of the inclined faces of the blocks 106. Mounted on stripper head 20 is a cam roller 146 which, when the stripper head frame is in an elevated position so that the shoes 22 are out of the matrices of the mold, is in alinement with the vertical run of the slot in cam plate 140. As the stripper head frame is caused to move downward the cam roller 146 enters the slot in cam plate 140, passes through the vertical run, and engages the inclined surface 150 of the slot, thereby forcing the mold frame to the left, so that the stripper shoes 22 can move through matrices 94 and 96. When the stripper head frame again moves upwardly, the cam roller 146 engages the opposite surface 152 of the slot camming the mold frame to the right so as to permit the stripper shoes to be freely withdrawn from matrices 94 and 96.

Operation of the entire machine is as follows: Assuming that a pallet has been fed forward by pallet feed conveyor (not shown), and is positioned directly over pallet receivers 66, the pallet receiver frame 48 is moved upward by cam 44 operating through lever 52 and link 50. As the frame 48 moves upward, the receivers 66 engage the bottom surface of pallet 68 and push it up against the bottom surfaces of the mold frame members 84 and 86, lifting these members off of projections 80 and 82 of machine frame elements 2 and 4. This provides for free vibration of the mold except for its engagement with the pallet.

The mixture is then fed into the matrices. While not illustrated it is to be understood that this may be accomplished by standard mechanism operating in a conventional manner, e.g. a feed box is advanced over the mold to deposit mixture into the matrices and is then withdrawn to wipe off the surplus mixture from top plate of the mold, leaving the matrices filled to the top.

Conventional means, forming no part of this invention, cause the vibrator motors 124 and 126 to commence operation as the mixture is fed into the matrices. The vibration eliminates the need for tamping the mixture.

Thereafter the stripper head frame is lowered by cam 40 acting through lever 30 and link 26. As the stripper head frame descends, the stripper shoes begin to pass into the cavities of the mold to compress the soft cement mixture therein into a compact mass. As this occurs the cam roller 146 enters and continues through the straight vertical run of the slot in the cam arm 140. Simultaneously the upper contactors 72 and 74 engage lower contactors 76 and 78, and thereby operate an electric circuit (not shown) to stop the motors 124 and 126.

Figure 3:
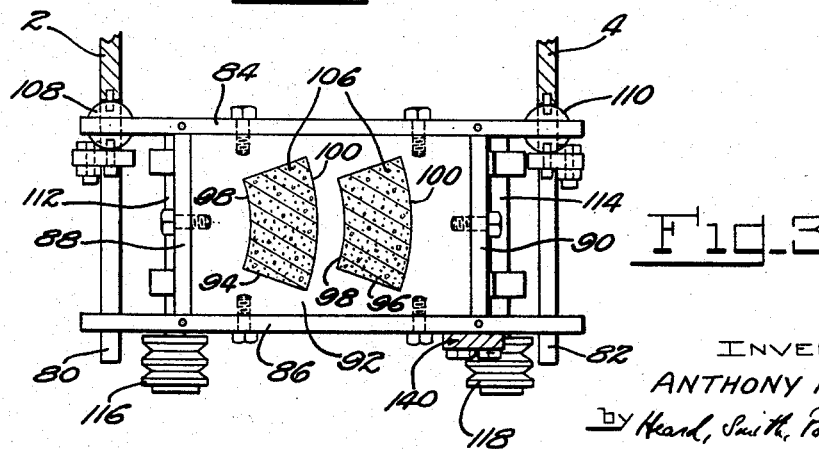
Fig. 3 is a horizontal section taken on line 3—3 of Fig. 1.

The stripping operation commences simultaneously with termination of motors 124 and 126. As the stripping shoes 22 continue to be lowered, the cam roller 146 enters the inclined portion of the slot in cam 140, and engages cam surface 150, thereby causing the mold frame to gradually slide in guides 108 and 110 (Fig. 3), from the position of Figs. 2 and 2 to the position of Fig. 4. Simultaneously pallet 68 is lowered in unison with the lowering of the stripper head frame by contactors 72 and 74 which bear down on contactors 76 and 78 respectively carried by the pallet frame 48. Shifting of the mold and mold frame permits shoes 22 to successfully penetrate the matrices, pushing the molded mixture out of the mold.

As the mold and mold frame shift, motors 124 and 126 are rotated about their pivots from the positions in Fig. 1 to the positions shown in Fig. 4. Motor 126 is elevated by the increased tension on its belts, and motor 124 is lowered by the slack occasioned in its belts by sidewise movement of the mold frame.

After the shoes have pushed to the bottom of the mold, cam 38 operates to raise the stripper frame to withdraw the shoes 22 to their normal position out of the mold, while cam 46 lowers the pallet receiver to a level to permit the pallet to be transferred onto conveyor 70 which moves the block-carrying pallet away from the machine.

As the stripper frame moves upward cam roller 146 engages cam face 152 to force the mold frame to return to its normal position (Fig. 1) in synchronism with the upward movement of the stripper frame. Screw 139 stops the mold frame in the proper position with cam plate 140 in alinement with roller 146. The mold is then in position to receive a new charge for another block making cycle.

While not illustrated, it is to be understood that the various cam shafts are driven in synchronism by suitable means so as to cause the machine to operate according to the sequence previously described.

The advantages of the present invention are directly attributable to the concept of moving the mold frame by means of a cam wheel carried by the stripper head and acting on a cam surface associated with the mold frame. However, it is to be understood that the positions of the cam plate and the cam roller may be reversed without sacrificing any of the advantages.

One advantage of the present invention is that it allows a conventional block molding machine to be more versatile. Another advantage is that it can be applied to conventional block molding machines with a minimum of changes and expense. Still another advantage is that the mold cavities and the stripper shoes are always in alinement so as to decrease the wear on the stripper shoes and the mold that would occur if the shoes provided the lateral thrust to the mold frame.

Obviously many modifications and variations of the present invention are possible in the light of the above teachings. Therefore, it is to be understood that the invention is not limited in its application to the details of construction and arrangement of parts specifically described or illustrated, and that within the scope of the appended claims it may be practiced otherwise than as specifically described or illustrated.

I claim:

1. A block molding machine comprising a vertically reciprocal pressure head, a mold frame, a mold disposed within said mold frame, means supporting said mold frame in a horizontal plane in the path of said pressure head, said mold frame being movable at right angles to the path of said pressure head, first and second vibrating assemblies associated with said mold frame, first and second motor means pivotally mounted on the frame and generally in the plane as the path of said pressure head of said machine at opposite ends of said mold frame, and flexible tension driving means connecting said motors and said vibrating assemblies, said motors being movable by means of said flexible tension driving members with said mold frame as said mold frame is moved laterally of said machine.

2. A machine for molding batter blocks, comprising a main frame, a mold frame mounted for horizontal reciprocation in said main frame, a mold carried within said mold frame, a vibrator mounted on said mold frame, a motor pivotally mounted on said main frame generally in the same plane as said mold frame, a belt running from said motor to said vibrator, a stripper mounted above said mold frame, means for reciprocating said stripper vertically, and means controlled by the movement of the stripper for sliding said mold frame horizontally, said motor pivoting as said mold frame moves.

3. A machine for molding blocks, comprising a main frame, a mold frame mounted for horizontal movement in said main frame, a mold disposed in the mold frame and having a cavity provided with inclined parallel faces, a vibrator mounted on said mold frame, a motor pivotally mounted on said main frame and generally in the same plane as said mold frame connected to said vibrator, said motor pivoting as said mold frame moves, a stripper mounted in said main frame above said mold frame, means for vertically reciprocating said stripper, a cam having a face inclined from the vertical parallel to said faces and mounted on said mold frame, and a cam follower mounted on said stripper in engagement with said cam, whereby the mold frame is moved horizontally as the stripper moves vertically.

4. A machine for molding batter blocks, comprising a main frame, a mold frame mounted on said main frame for horizontal reciprocation in said main frame, a vibrator mounted on said mold frame, a motor pivotally mounted on said main frame and generally in the same plane as said mold frame and having a flexible driving connection with said vibrator, said motor pivoting as said mold frame moves, a mold carried in said mold frame and having a cavity having inclined parallel faces, a stripper shoe inclined from the parallel to said faces and mounted above said mold, means for moving said stripper shoe vertically, and means including a cam for sliding said mold frame and mold bodily horizontally as said stripper shoe moves vertically, whereby said stripper shoe passes through the mold cavity.

5. A machine for molding batter blocks, comprising a main frame, a mold frame mounted on the main frame for horizontal reciprocation, a mold carried in said mold frame and having a cavity having inclined parallel faces, a vibrator mounted on said mold frame, a motor pivotally mounted on said main frame and generally in the same plane as said mold frame and having a flexible driving connection with said vibrator, said motor pivoting as said mold frame moves, a stripper shoe dimensioned to fit into said cavity and inclined parallel to said faces, means mounting said stripper shoe for vertical movement from a position above said cavity, and means including a cam mounted on the stripper shoe for actuating said means for horizontal reciprocation in controlled relation to the vertical movement of the stripper, whereby the compound vertical and horizontal motions of the stripper shoe and mold frame cause the stripper to move through said cavity.

6. A block molding machine comprising a main frame, a pressure head member mounted thereon, a mold supporting frame member movably mounted on said main frame, a mold disposed within said mold frame member, a vibrator mounted on said mold frame member, a motor pivotally mounted on said main frame and generally in the same plane as said mold frame and having a flexible driving connection with said vibrator, said motor pivoting as said mold frame moves, means for reciprocating the mold frame member and pressure head member relative to one another through a vertical path, said mold frame member being also movable laterally with respect to the pressure head member, and cam means mechanically interposed between said pressure head member and said mold frame member for moving said mold frame member laterally in controlled relation to the relative vertical movement between said members.

7. A block molding machine having a main frame, a vertically reciprocal pressure head mounted thereon, a mold, a mold supporting frame mounted on said main frame and being movable laterally of said pressure head, a vibrator mounted on said mold frame, a motor pivotally mounted on said main frame and generally in the same plane as said mold frame and having a flexible driving connection with said vibrator, said motor pivoting as said mold frame moves, means for moving said pressure head vertically, and cam means mechanically interposed between said pressure head and mold frame for causing lateral movement of said mold frame as said pressure head moves in a vertical direction.

References Cited in the file of this patent
UNITED STATES PATENTS

| | | |
|---|---|---|
| 776,794 | Peabody | Dec. 6, 1904 |
| 1,786,629 | Pepper | Dec. 30, 1930 |
| 2,341,012 | Billman et al. | Feb. 8, 1944 |
| 2,519,994 | Beyerdorfer | Aug. 22, 1950 |
| 2,532,049 | Wittke | Nov. 28, 1950 |
| 2,566,787 | Zevely | Sept. 4, 1951 |
| 2,672,669 | Davis | Mar. 23, 1954 |